(12) United States Patent
Nakamura et al.

(10) Patent No.: US 9,160,150 B2
(45) Date of Patent: Oct. 13, 2015

(54) WIRE STRIPPER

(71) Applicant: KOMAX HOLDING AG, Dierikon (CH)

(72) Inventors: Akio Nakamura, Tokyo (JP); Benno Zemp, Eschenbach (CH)

(73) Assignee: Komax Holding AG, Dierikon (CH)

( * ) Notice: Subject to any disclaimer, the term of this patent is extended or adjusted under 35 U.S.C. 154(b) by 258 days.

(21) Appl. No.: 13/955,064

(22) Filed: Jul. 31, 2013

(65) Prior Publication Data

US 2014/0033874 A1 Feb. 6, 2014

(30) Foreign Application Priority Data

Aug. 1, 2012 (JP) ................... 2012-170712

(51) Int. Cl.
*H02G 1/12* (2006.01)
(52) U.S. Cl.
CPC ........... *H02G 1/1253* (2013.01); *H02G 1/1256* (2013.01)
(58) Field of Classification Search
CPC ..................... H02G 1/1253; H02G 1/1256
See application file for complete search history.

(56) References Cited

U.S. PATENT DOCUMENTS

| | | | | |
|---|---|---|---|---|
| 2,671,363 A * | 3/1954 | Wells | ............................. | 81/9.51 |
| 3,645,156 A * | 2/1972 | Meyer et al. | .................... | 83/862 |
| 4,345,362 A * | 8/1982 | de Givry | ...................... | 29/426.5 |
| 4,999,910 A * | 3/1991 | Cross | ............................... | 29/825 |
| 5,272,941 A * | 12/1993 | English et al. | ................ | 81/9.51 |
| 5,320,002 A * | 6/1994 | Sayyadi et al. | ................ | 81/9.51 |
| 5,361,653 A * | 11/1994 | Pradin | ............................ | 81/9.51 |
| 6,523,251 B2 * | 2/2003 | Meisser et al. | .................. | 29/825 |
| 8,739,657 B2 * | 6/2014 | Nakamura | ....................... | 81/9.4 |
| 9,032,842 B2 * | 5/2015 | Hombu | .......................... | 81/9.51 |
| 2009/0079478 A1* | 3/2009 | Hsu et al. | ...................... | 327/156 |

FOREIGN PATENT DOCUMENTS

| | | |
|---|---|---|
| JP | H0787643 A | 3/1995 |
| JP | H10112913 A | 4/1998 |
| JP | 3501596 B2 | 3/2004 |
| JP | 4883821 B1 | 2/2012 |
| WO | 2012015062 A1 | 2/2012 |

* cited by examiner

*Primary Examiner* — David B Thomas
(74) *Attorney, Agent, or Firm* — Fraser Clemens Martin & Miller LLC; William J. Clemens

(57) ABSTRACT

A wire stripper includes a displacement current detection and current-voltage conversion circuit that when stripping blades contact a wire core of an electric wire in a process of stripping a coating of the electric wire at a time when a predetermined time t has elapsed since a square DC signal was applied to the stripping blades from an electric signal generator circuit through a signal line, detects a displacement current of the signal line, converts the current into a voltage, and holds the voltage; and a determination circuit that determines whether the voltage of the signal line is a voltage level Vok at a time of non-contact or a voltage level Vng at a time of contact of the stripping blades with the wire core so as to detect the contact of the stripping blades with the wire core.

14 Claims, 11 Drawing Sheets

Operation Flow Chart

WIRE STRIPPER

FIELD

The present invention relates to a wire stripper having a core contact detecting function, that is, a function of detecting a contact between a wire core of an electric wire and stripping blades, capable of detecting a contact therebetween even if the electric wire is cut short, and capable of simplifying a system for use in the detection.

BACKGROUND

There is known a device for stripping coating away from electric wire (in the following referred to as "wire stripper", as the case may be) which is so designed that the stripping blades are fed into the coating of electric wire and put into a relative movement against the said electric wire so as to strip (strip away) a part of the said coating.

When stripping the coating of electric wire by the wire stripper, it is necessary to feed the blade into the wire coating as deeply as possible in order to cut the wire coating more precisely and sharply. The wire core may, however, be subject to be scratched or a part of it may be cut off if the blade comes in contact with the wire core to result in rejection of the electric wire concerned.

Since absolute safety is demanded especially for the electric wire for automotive or aircraft industries, even an electric wire having the slightest scratches on its core is rejected for the reason that it may be damaged and lead to serious accidents if used for movable parts or in any position subject to vibrations because of stress concentration on the scratches.

A function to detect any contact between the wire core and the stripping blade is, therefore, deemed as indispensable for the wire stripper so that a number of automatic wire strippers developed in recent years are provided with the said function of contact detection. Most of them, however, use a method to detect any contact between the wire core and the blade through detection of electric conduction between electrodes which are allocated to them, respectively.

As an example, a wire core scratch detector according to the patent document JP 7-87643 referred to later is described in the following while taking FIG. 10 as the basis.

According to this heretofore known technique, an electric wire 63 is led through a wire guide 84 and fastened by a wire gripper 85. A cassette blade 86 is then put into operation to make an incision on an insulating coating 71 of a core 70 of the electric wire 63 by means of incision making cutters 87 and to cut the electric wire 63 by means of cutting blades 82 so as to strip the coating by simultaneously pulling it axially by means of a wire gripper 85.

When the incision making cutters 87 in the cassette blade 86 come now in contact with the wire core 70 in the phase of incision to the coating 71, an alternating current flows through it by way of a capacitance arising between the electric wire 63 and the wire gripper 85, a detector 88 and an AC power supply 89 in the said order. A voltage corresponding to this current is detected by the detector 88 to confirm the contact of the incision making cutter 87 with the wire core 70.

It is extremely difficult for the method of detecting core scratches according to JP 7-87643 as shown in FIG. 10 to ensure a point to attach a corresponding mechanism if the electric wire to be finished is of short lengths. The said detection method is inappropriate also from the safety point of view in case of manual stripping operation by use of a desktop wire stripper.

In view of this, the present applicants have already proposed a wire stripper (hereinafter referred to as a wire stripper of our prior patented invention) as disclosed in WO 2012/015062 A1, which uses a cutter (stripping blades) as a detection sensor to detect an impedance (including resistance, inductance, and capacitance) of a wire core of an electric wire, and thereby to be able to detect a wire core scratch with high precision under the same conditions for the electric wire cut to any length, no matter how short or how long it is.

According to the wire stripper of WO 2012/015062, which is illustrated in FIG. 11, an electric signal from an electric signal generator circuit (signal generating circuit) 75 passes through a current limiting circuit 76 to a conductor 73 and then given to stripping blades 27 and 27. The electric signal further passes through a filter circuit 77 for removing noise and the like, then through a signal amplifier circuit 78 for monitoring a minute change at the moment of a contact of the stripping blades 27 and 27 with the wire core 70, and then transmitted to a signal analyzer circuit 74. A logic circuit for determination (signal determination circuit) 80 receives a signal from the signal analyzer circuit 74 and a preset determination time for wire coating stripping operation from a control circuit 79 to finally determine whether or not there is a contact between the stripping blades 27 and 27 and the wire core 70. If a determination is made that there is a harmful contact therebetween, an error (Err) is displayed on a display window 21 with a display device.

The electric signal can be sampled in cycles e.g. on the microsecond time scale. When the stripping blades 27 contact the wire core 70 of electric wire W (63), a pulse output is generated according to the position of the stripping blades at a time when the coating 71 is stripped. The pulse is detected by the signal analyzer circuit 74 as a change in impedance caused by addition of the impedance of the wire core 70.

In this manner, it allows for an alternative determination to deem a wire product as non-rejectable according to the extent or portion of contact even if the stripping blades have come in contact with its core by provision with a function to enable optional setting of positional and temporal elements of contact for detecting any contact between the said stripping blades and the wire core and thus to manage such temporal elements right from the beginning till completion of the said stripping operation in order to prevent unnecessary operation discontinuation in case of employment of the said function for an automatic wire stripper, etc.

SUMMARY

Technical Problem

In the wire stripper of the prior patented invention, the displacement current obtained from the stripping blades is a current flowing when the current direction is changed, and thus it is common to detect the current by applying an AC signal, resulting in complicated configuration of a circuit that generates the AC signal and complicated designing and manufacturing, and thus increasing the entire system costs. Differently from the prior patented invention, the above is the same as the other methods or mechanisms for detecting a displacement of the electric signal applied to the stripping blades.

An object of the present invention is such that the wire stripper uses the stripping blades as a detection sensor to devise an electric signal to be applied and thereby to be able to detect a wire core scratch with high precision under the same conditions for the electric wire cut to any length, no matter how short or how long it is, so as to simplify a power supply circuit configuration and reduce the entire system costs.

Solution to Problem

The above-identified objects are solved by the present invention by a wire stripper according to claim 1.

Specifically, the present invention as it is claimed in claim 2 relates to a wire stripper configured to feed stripping blades into coating of an electric wire and to strip a part of the coating by moving the stripping blades relatively against the electric wire, wherein it is provided with an electric signal generator circuit that applies a square wave DC electric signal to the stripping blades through a signal line; a displacement current detection and current-voltage conversion circuit that detects a displacement current from the stripping blades through the signal line at a time when a predetermined time has elapsed since the electric signal was applied to the stripping blades, converts the current to a voltage, and holds the voltage; and a determination circuit that determines whether the held voltage is a voltage level representing a non-contact or a voltage level representing a contact of the stripping blades with the wire core, and wherein when the stripping blades contact the wire core of the electric wire in a process of stripping the coating, the determination circuit determines that the voltage level is the voltage level of the signal line representing the contact or in the event of the contact, and thereby detects that the stripping blades contact the wire core.

Further advantageous embodiments of the present invention are defined in dependent claims 3 to 14.

Advantageous Effects of Invention

The present invention uses the stripping blades as a detection sensor, that is, uses a square wave DC signal as the electric signal applied to the stripping blades (that is, does not apply an AC signal such as a sine wave that complicates the circuit configuration). The reason for this is that the electric signal can also be detected by detecting a transient current at the moment from when power is not connected to when power is connected or the reverse (that is, from a state in which power is connected and current does not flow to a state in which power is disconnected). Here, the transient current is a current flowing from the stripping blades existing in an open circuit (open loop) to ground (earth) through space, and thus the above detection is enabled simply by applying the electric signal to the stripping blades.

Accordingly, in the present invention as it is claimed in claim 2, by way of example, there is provided a circuit that when a predetermined time (t) has elapsed since a DC signal was applied from a power supply, detects a displacement current from the stripping blades through a signal line, converts the current into a voltage. The displacement current detection and current-voltage conversion circuit may holds the voltage. The circuit is configured to determine whether the converted voltage or the converted held voltage is a voltage level representing a non-contact or a voltage level at a time of contact of the stripping blades with the wire core, thereby to be able to detect a wire core scratch with high precision under the same conditions for the electric wire cut to any length, no matter how short or how long it is, to detect the signal by applying a square wave of a single power source that can be implemented by a relatively simple configuration, thereby eliminating the need to provide a negative power supply in a detection system, simplifying the configuration of the entire system such as a power supply circuit, a waveform generating circuit, and a wave detection circuit, and reducing the entire system costs.

The invention could also be directed to a method of detecting any contact between a wire core and stripping blades using the above mentioned wire stripper and further described therein.

DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION

Figure 1A:
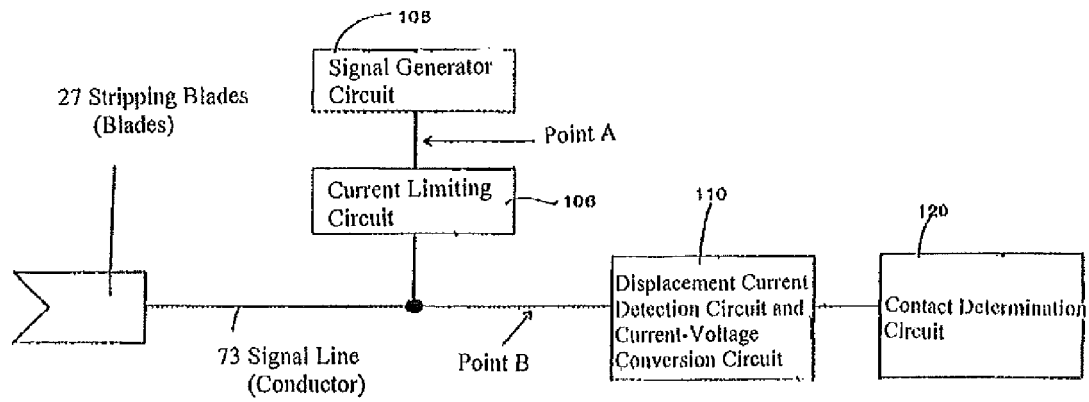
FIG. 1 Schematic view (A) of main components in a configuration of detecting a contact between a wire core and stripping blades for a wire stripper as an embodiment of the present invention and each waveform diagram (B), (C), (D) at the detection.

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

The wire stripper of the present invention may be configured such that it is provided with the electric signal generator circuit that generates an electric signal for detecting an impedance (including resistance, inductance, and capacitance) through the stripping blades; a signal analyzer circuit incorporating the detection and conversion circuit having a function of detecting the impedance; and the determination circuit; and when the stripping blades contact the wire core of the electric wire in a process of stripping the coating, a change in the impedance caused by addition of the impedance of the wire core to the stripping blades is detected as a displacement current, the displacement current is converted into a voltage and held, and the voltage level is determined by the determination circuit.

In addition, the electric signal generator circuit can generate a square wave of a single power source as the electric signal, continuously hold a transient voltage at rising time of the square wave when the voltage is held, and continuously detect a presence or absence of contact of the stripping blades with the wire core.

In addition, when the electric signal is applied to the stripping blades and the stripping blades contact the wire core of the electric wire, the electric signal changes by the impedance of the wire core. There is provided a function of monitoring this phenomenon, which can detect a contact between the wire core and the stripping blades.

Further, there may be provided a function of arbitrarily setting the moment or the period of time when a detection is made whether or not the stripping blades contact the wire core, and managing each temporal element such as the time to start the stripping operation, immediately before or during the end thereof, and further the period of time when the stripping blades contact the wire core.

In this case, the temporal element managing function can be used to set a condition in which even if the stripping blades contact the wire core, the wire is not considered as defective depending on the contact time or the contact position. Specifically, when a detection is made whether or not the stripping blades contact the wire core, the contact position and temporal elements can be arbitrarily set to manage the temporal elements such as the contact time between the stripping blades and the wire core, and the position thereof during the period of time immediately from the start of the stripping operation to the end thereof, the function of which can be used to determine that even if the stripping blades contact the wire core, the wire is not considered as defective depending on the degree and the position thereof so as to prevent unwanted operation stop when the wire stripper is adopted in an automatic machine and the like.

In addition, the wire stripper according to the preferred embodiment configured as an automatic machine having a function of stripping a part of the coating as well as a function of cutting the electric wire at a predetermined position is an automatic wire stripper configured such that at a front end portion of the electric wire drawn from a wire storage unit, the stripping blades are fed into the coating of the electric wire, and then the electric wire is conveyed backward to strip a part of the coating, at the time of which a core contact detecting means detects a contact of the stripping blades with the wire core; and after the coating is stripped at the front end portion, the electric wire is conveyed by a predetermined length forward, that is, the drawing direction, in the state of which the electric wire is cut by the stripping blades at a position backward from the front end portion, and then the electric wire is returned backward by an expected strip length, further in the state of which the stripping blades are fed into the coating, and then the electric wire is conveyed forward to strip a part of the coating, also at the time of which the core contact detecting means detects a contact of the stripping blades with the wire core.

Note that in the wire stripper of the present invention, an electrode for detecting whether or not the stripping blades contact the wire core is actually the stripping blades; and the electric signal (input to the stripping blades) and a contact detection signal (output from the stripping blades) between the wire core and the stripping blades are applied or extracted through the same position (the stripping blades).

Further, the configuration may be such that a pair of the stripping blades are provided facing each other and sandwiching the electric wire therebetween, in the state of which after the cutting, the electric wire is configured to be movable; and the front end of the electric wire is inserted between the pair of the stripping blades, and then abuts against the front end side of a sensor rod, which starts the stripping operation.

Next, with reference to FIGS. 1 to 8, preferred embodiments of the present invention will be described.

First, a desktop wire stripper as an embodiment of the invention is described below in detail while referring to FIGS. 3, 4 and 5. The electric wire may in the following description be referred to simply as wire, as the case may be.

Figure 3:
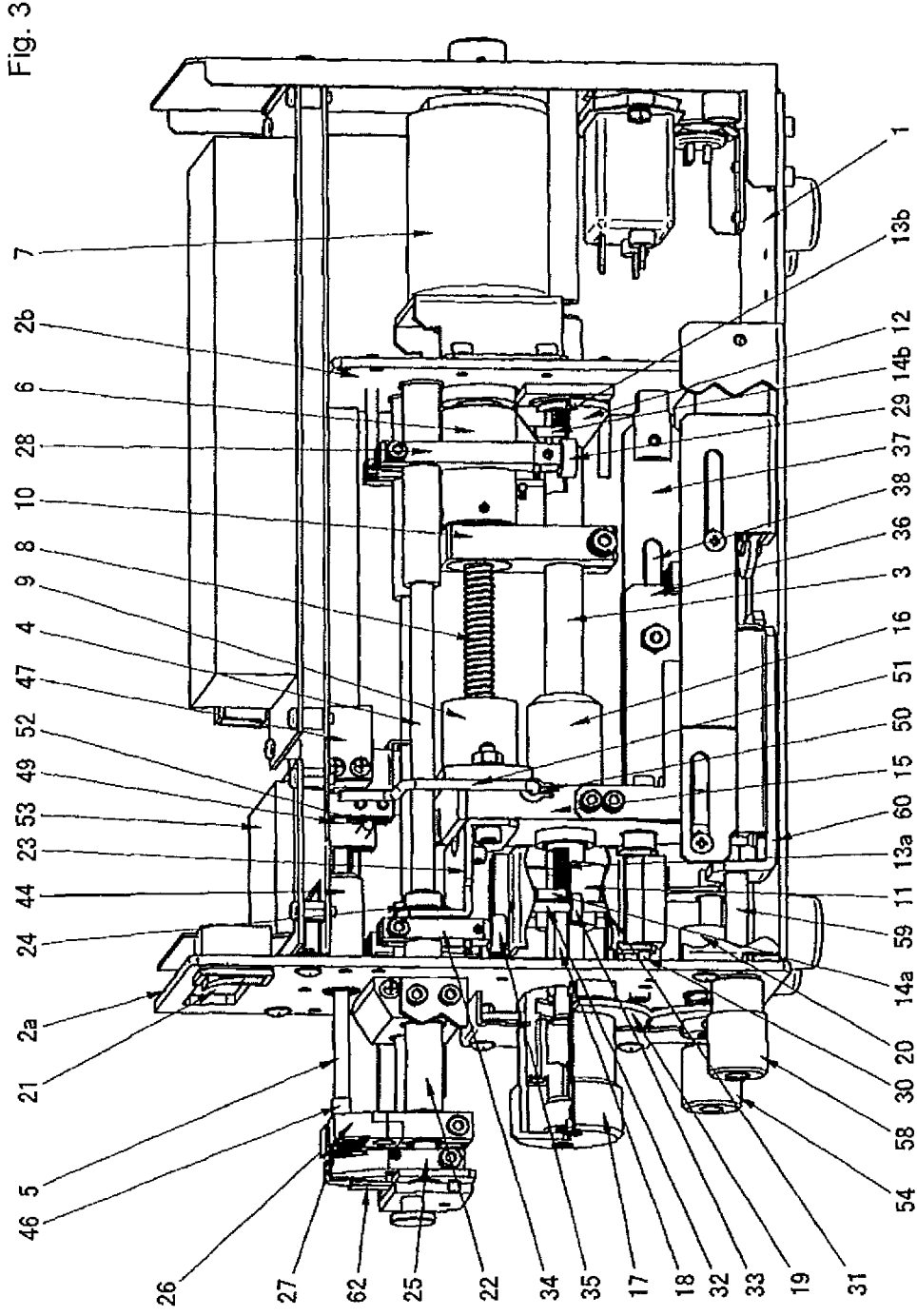
FIG. 3 View of internal structure of a desktop wire stripper as above.

The internal structure of the wire stripper according to this embodiment is described on the basis of FIG. 3. This device is of constitution equivalent to that of the wire stripper according to Japanese Patent No. 3501596 granted to the applicant, supplemented with an additional mechanism or function for detection of any contact between the wire core and the stripping blades. In the following description, the left side of the drawing corresponding to the wire insertion side is referred to as "front portion", while the right side is referred to as "rear portion".

A main spindle 3 is here borne in a rotatable and axially slidable manner in the section from the front end of machine frame 1 to the lower portion between intermediate side walls 2a and 2b while two auxiliary shafts 4, 4 which are parallel to each other are borne also in a freely rotatable manner between the side walls 2a and 2b directly above the main spindle 3. In addition, a positioning rod 5 is provided above the center between these auxiliary shafts 4, 4 to determine the position for wire end insertion and to obtain the starting signal.

A shaft is provided directly above and parallel to the main spindle 3 while the rear end of the shaft is formed as a spline shaft 6 on which the rotating shaft of an electric motor 7 located in the rear portion of the side wall 2b is fitted in a slidable manner so that rotation of the motor 7 is transmitted via the spline shaft 6 to a ball screw shaft 8 coaxial with the spline shaft 6. A ball nut member 9 is allowed to freely move axially forward and backward by rotational motion of the ball screw shaft 8. The lower portion of an arm 10 fitted between the spline shaft 6 and the ball screw shaft 8 in a freely rotatable manner grasps the main spindle 3 and causes it axially to slide so that an identical position with that of the ball screw shaft 8 may be kept.

On the main spindle 3, a first conical cam 11 and a second conical cam 12 tapering off to the front side, respectively, are fitted in a coaxially slidable manner, while compression springs 13a, 13b in the form of a coil are inserted to them, respectively, to forward press the first conical cam 11 and the second conical cam 12, respectively, with a prescribed force via pins 14a, 14b. The main spindle 3 is inserted in a bushing 16 in a slidable manner, which is fixed to a move board 15 to which in turn the ball nut member 9 is fixed.

At the front end of the main spindle 3 protruding from the side wall 2a of the machine frame 1, an incision adjusting knob 17 is provided for adjusting the incision to the wire coating in such manner that a positioning member 18 is allowed to move forward and backward by screw-through rotation of the adjusting knob 17. The positioning member 18 is so constituted to freely strike on the pin 14a of the first conical cam 11 that advance of the first conical cam 11 can be stopped. In addition, the corresponding incision diameter is indicated on an indication window 21 on the upper front part of the device in conjunction with rotation of the adjusting knob 17.

Pipe-like tube shafts 22, 22 are fitted externally to the front end of the auxiliary shafts 4, 4 in a slidable manner while the rear end of these tube shafts 22, 22 is inserted into and borne by a bearing 24 of arm 23 which is Z-formed laterally and fixed to the move board 15. The base of grippers 25, 25 is fixed to the front end of the auxiliary shafts 4, 4 protruding from the tube shafts 22, 22, while the base of blade holders 26, 26 located behind the grippers 25, 25 is fixed to the front end of the tube shafts 22, 22. The stripping blades 27, 27 having a V-shaped edge are fixed to the front faces positioned oppositely to each other in the blade holders 26, 26 as shown in FIG. 5.

Since the ball nut member 9 is fixed in position as shown in FIG. 3 at the beginning of forward rotation of the motor 7, the main spindle 3 advances along with advance of the ball screw shaft 8 as it is screwed with the balls in the ball nut member 9 by its forward rotation. Then, the conical cam 11 first pushes away the cam rollers 33, 33 to both sides to set the upper ends of oscillating members 31, 31 apart from each other while oscillating them so that the oscillating members 31, 31 push rollers 35, 35 on arms 34, 34 to rotate the tube shafts 22, 22, respectively, which form an entirety with the said rollers, and to close the blade holders 26, 26 at the front end of the said tube shafts. As a result of this, the stripping blades 27, 27 in the blade holders 26, 26 are fed into the coating 71 of wire W to a prescribed depth and clamp them as shown in FIG. 5(B).

Arms 28, 28 are fixed at the upper end to near the rear end of the auxiliary shafts 4, 4 and runs vertically down from there. Cam rollers 29, 29, which are attached to the lower end of these arms 28, 28 in a manner freely rotatable within a horizontal plane, strike on the peripheral face of the second conical cam 12 and are pushed by this peripheral face along with advance of the second conical cam 12 to rotate the auxiliary shafts 4, 4 in opposite directions to each other so that the grippers 25, 25 close along with advance of the second conical cam 12 and open along with its retraction.

The oscillating members 31, 31 are attached to both sides of the first conical cam 11 while being supported at the lower end by the side wall 2a to be capable of freely pivoting on shafts 30, 30 and cam roller 33 on a vertical shaft 32 of the oscillating member 31 abuts against the peripheral face of the first conical cam 11. Rollers 35, 35 abut against the outer side of the upper end of this oscillating member 31, while being supported at the lower end of the arms 34, 34 fixed to the tube shafts 22, 22 in a manner freely rotatable within a horizontal plane. According to advance and retraction of the first conical cam 11, the tube shafts 22, 22 rotate in opposite directions to each other via the arms 34, 34 so that the blade holders 26, 26 close along with advance of the first conical cam 11 and open with its retraction.

A brake unit 36 is interposed between the move board 15 and the side wall 2b on the rear portion of the machine frame 1. This brake unit 36 serves for ensuring a resistance to the ball nut member 9 during its backward movement and is so constituted that a plate 40 on the move board 15 side is connected via a penetrating shaft 39 to a horizontal slot 38 formed on the base 37 fixed to the side wall 2b and that a frictional braking action by spring force of a spring 41 upon a shoe 42 is given to the base 37 so as to convert the resistance of the ball nut member 9 when it returns into the gripping force of the grippers 25, 25 and the incision force of the stripping blades 27, 27, respectively.

When the timing of movement of the first conical cam 11 and the second conical cam 12 is concerned, the main spindle 3 advances by the ball screw shaft 8 while the ball nut member 9 remains fixed to close the blade holders 26, 26 by the first conical cam 11 and then to close the grippers 25, 25 along with advance of the second conical cam 12. If the second conical cam 12 stops advancing, the ball nut member 9 retracts by then arising reactive force against the load of the brake unit 36, whose resistance in turn acts on the grippers 25, 25 to close and grip the wire 63, while the coating is pulled (stripped) away from the wire core as the blade holders 26, 26 retract along with retraction of the ball nut member 9.

Figure 4:
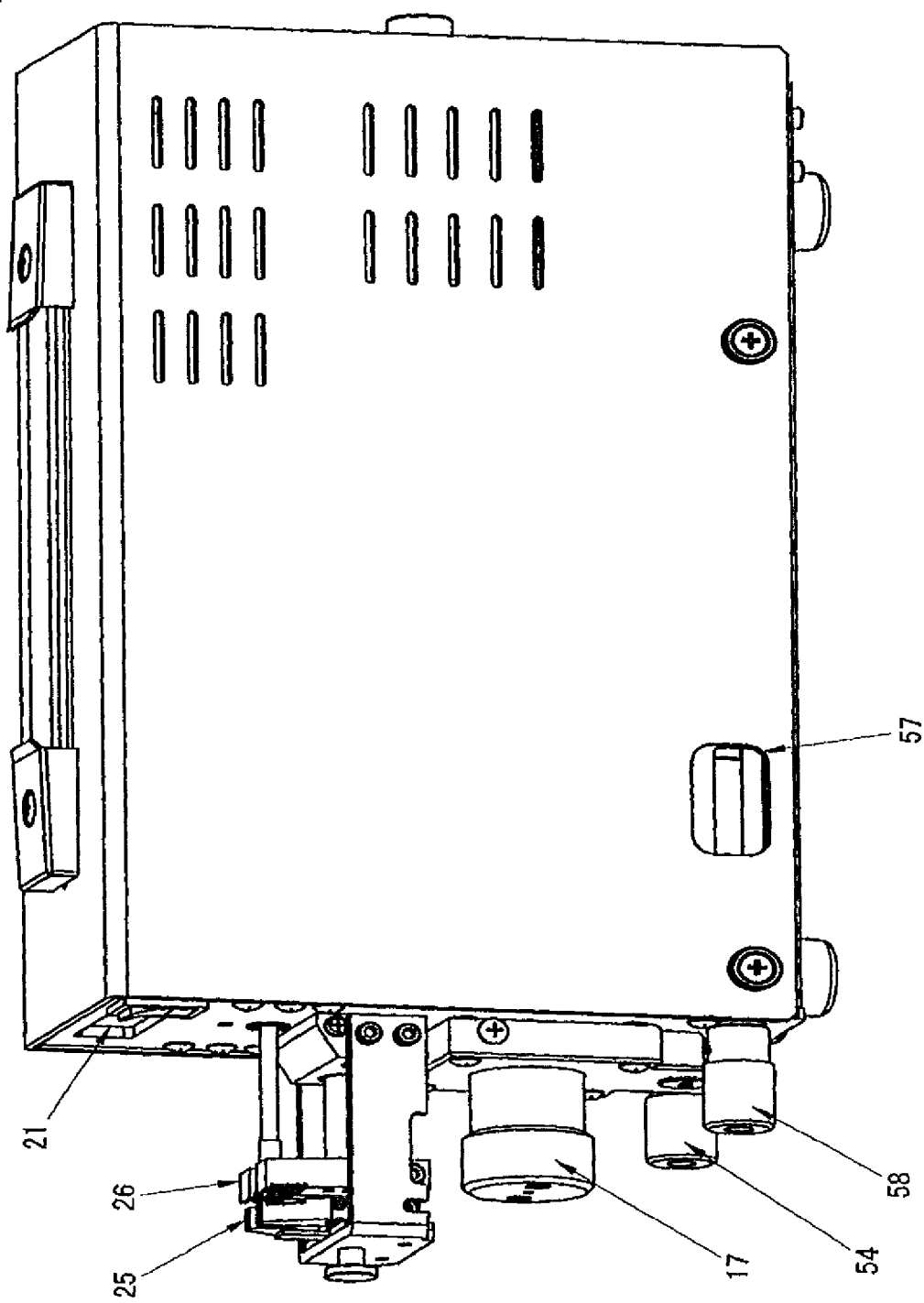
FIG. 4 External view of a desktop wire stripper as above.

As shown in FIG. 4, it is also possible by turning a knob 58 for adjusting the lead length of coating to adjust the position of a sensor 61 issuing motor reversing command, which is located on a bracket 60 screwed with a screw shaft 59 of the lead length adjusting knob 58, so as to adjust the lead length of coating. It is further enabled to indicate in the display window 57 corresponding lead length of coating converted from the position of the sensor 61 for issuing motor reversing command. Incidentally, numeral 62 in FIG. 5 stands for a supporting member for wire insertion.

By varying the position of a positioning member 56 by turning a knob 54, an outer tube 43 is, therefore, positioned by tension spring (not shown in the drawings) via a lever 51, a stopper 46 of a sensor rod 45 is positioned and the insertion depth (or point) of the wire end is set so as to choose the stripping length of coating. A turning of the knob 54 leads to indication of a stripping length of coating in the graduated indication window 57 formed on the side of the device, converted from the position of the positioning member 56 (see FIG. 4).

The blade holders 26, 26 are of vertically dual-partitioning structure where the upper portion fixing the stripping blades 27, 27 is made of an insulating material and the lower portion is composed of a metal so that the stripping blades 27, 27 are electrically isolated from the device.

In the said device according to the invention, any contact of the stripping blade 27 with the core 70 of wire W (63) is detected as follows in the course of stripping a part of the coating 71 of wire (63).

Figure 11:
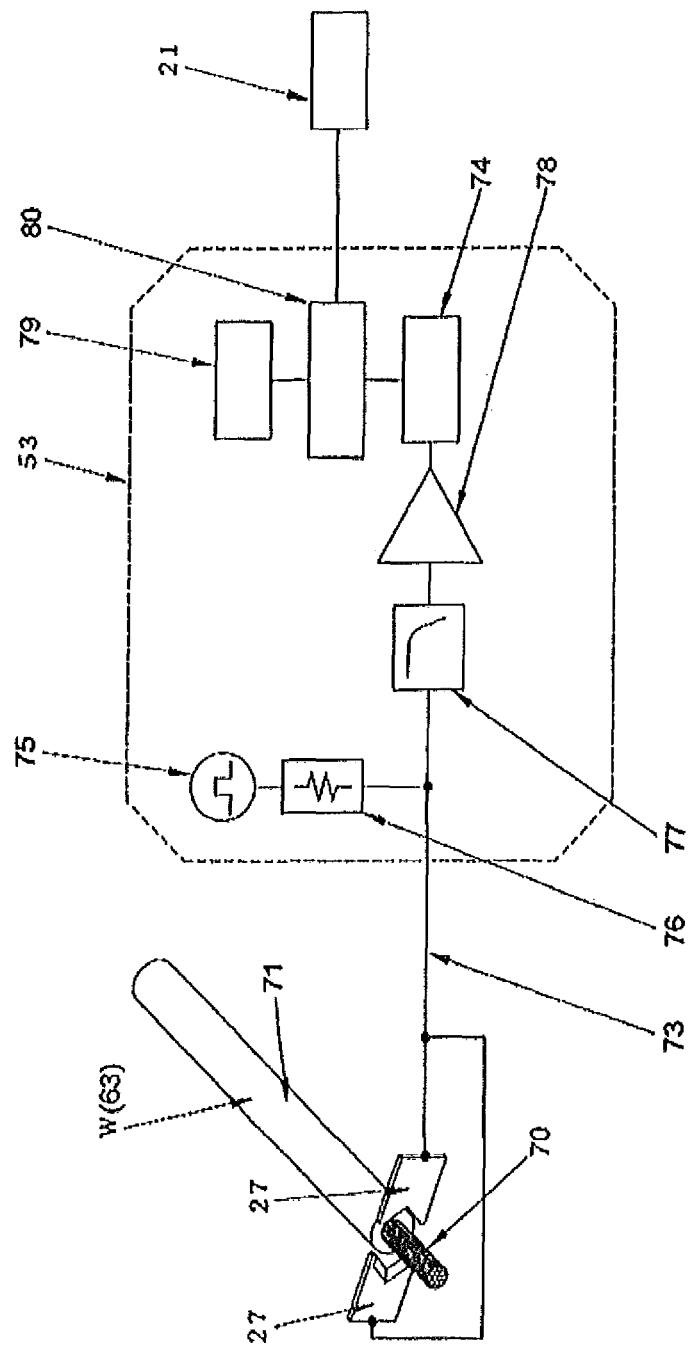
FIG. 11 Schematic view illustrating a mechanism of detecting a contact between a wire core and stripping blades as the wire stripper of WO 2012/015062 A1.

The stripping blades 27, 27 are connected to a control board 53 by means of a conductor 73 for impedance detection as prior patented invention shown in FIG. 11 so that impedance e.g. capacitance (the same applies to the following) can be measured through the stripping blades 27, 27 serving as electrodes. Furthermore, electric signal e.g. rectangular wave signal generated in an electric signal generation circuit 75 is transmitted via a current-limiting circuit 76 to the stripping blades 27, 27 in the circuit for detecting any contact with the core 70 of electric wire W (63).

The electric signal given to the stripping blades 27, 27 is led through a filter circuit 77 for removing noise, etc. and transmitted as prior patented invention shown in FIG. 11 to a signal analyzer circuit 74 via a signal amplifier circuit 78 for monitoring any minute change at the moment of contact of the stripping blades 27, 27 with the wire core 70. A logic circuit 80 for determination finally determines whether there has been any harmful contact between the stripping blades 27, 27 and the wire core 70 on the basis of the signal obtained from the signal analyzer circuit 74 and the preset determination time for wire coating stripping operation obtained from a control circuit 79. If determined that there has been any harmful contact, an error (Err) will be indicated in the indication window 21 with an indicator.

The said electric signal can be sampled in cycles e.g. on the microsecond time scale. If the stripping blades 27 have come in contact with the core 70 of electric wire W (63), a pulse output is generated depending on the blade position in operation to strip the coating 71 and is detected by the signal analyzer circuit 74 as a change in impedance due to addition of the impedance of the wire core 70.

In this manner, the stripping blades 27 can be used as a detection sensor to detect an impedance (including resistance, inductance, and capacitance) of the wire core 70 of the electric wire W as a displacement of an output level, and thereby to be able to detect a wire core scratch with high precision under the same conditions for the electric wire cut to any length, no matter how short or how long it is.

What matters at the time of this detection is, as illustrated in FIG. 1(A), that wire stripper includes an electric signal generator (generating) circuit 105 that generates a square wave DC electric signal and applies the signal to the stripping blades 27 through the current limiting circuit 106 and the signal line (conductor) 73; a displacement current detection and current-voltage conversion circuit 110, detects a displacement current (that is, a current flowing from the stripping blades to ground through space) from the stripping blades 27 through the signal line 73, converts the current into a voltage; and a determination circuit 120 that determines whether the voltage at a predetermined time (t) after the electric signal was applied to the stripping blades 27 is a voltage level representing a non-contact or a voltage level representing a contact of the stripping blades 27 with the wire core 70, wherein when the stripping blades 27 contact the wire core 70 of the electric wire W (63) in a process of stripping the coating 71, the determination circuit 120 determines that the voltage level is the voltage level of the signal line 73 representing a contact, and thereby detects that the stripping blades 27 and 27 contact the wire core 70.

In this case, in order to apply detection of the impedance, the wire stripper includes the electric signal generator circuit 105 for detecting an impedance (including resistance, inductance, and capacitance) through the stripping blades 27; the signal analyzer circuit incorporating the detection and conversion circuit 110 having a function of detecting the impedance; and the determination circuit 120, wherein when the stripping blades 27 contact the wire core 70 of the electric wire W (63) in a process of stripping the coating 71, a change in the impedance caused by addition of the impedance of the wire core 70 to the stripping blades 27 is detected as a displacement current, the displacement current is converted into a voltage, and the voltage is determined by the determination circuit 120.

Figure 1B:
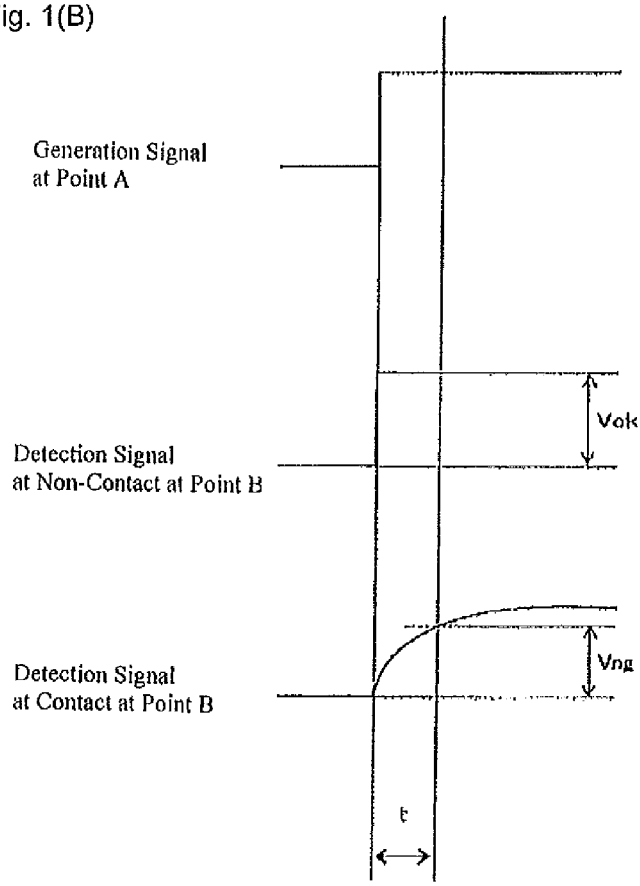

In this manner, as illustrated in FIG. 1(B), there is provided a circuit that when a predetermined time (t) has elapsed since a DC signal was applied at point A from signal generator circuit 105 of a single power source, detects a displacement current from the stripping blades 27 through a signal line, converts the current into a voltage. The determination circuit 120 is configured to determine whether the voltage at the predetermined time t is a voltage level Vok at a time of non-contact or a voltage level Vng at a time of contact of the stripping blades with the wire core, thereby to be able to detect a wire core scratch with high precision under the same conditions for the electric wire cut to any length, no matter how short or how long it is, to detect the signal by applying a square wave of a single power source that can be implemented by a relatively simple configuration, thereby eliminating the need to provide a negative power supply in a detection system, simplifying the configuration of the entire system such as a power supply circuit, a waveform generating circuit, and a wave detection circuit, and reducing the entire system costs.

The displacement current and the corresponding converted voltage have been determined in a direct way. However, it is conceivable that the displacement current detection and current-voltage conversion circuit 110 when a predetermined time (t) has elapsed since the electric signal was applied to the stripping blades 27 detects a displacement current and converts the current into a voltage, and holds the voltage. The determination circuit 120 determines whether the held voltage is a voltage level representing a non-contact or a voltage level at the time of contact of the stripping blades with the wire core.

Figure 1C:
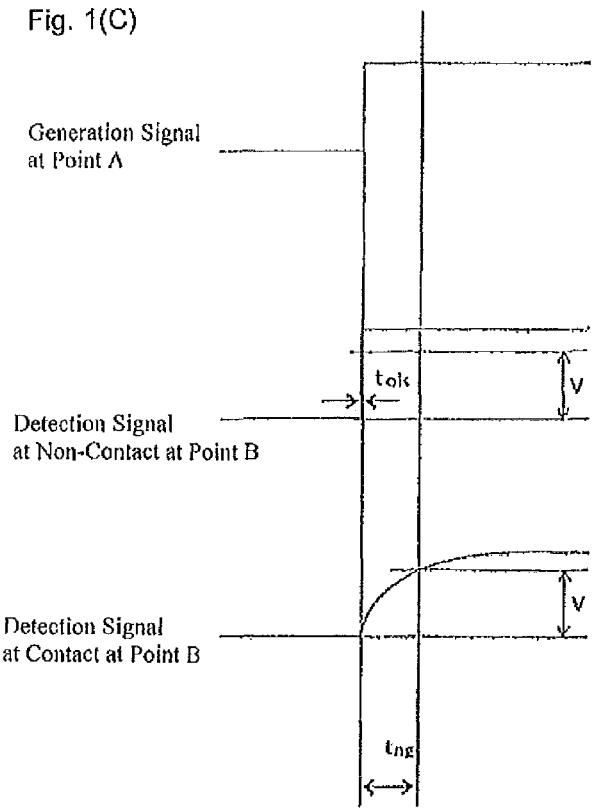

FIG. 1(C) shows an alternative way how to determine whether the stripping blades contact a wire core of the electric wire in a process of stripping the coating by analyzing the voltage-time curve obtained from the displacement current detection and current-voltage conversion circuit. When the determination circuit determines that the time at a when the voltage reached a predetermined voltage-level V derived from the voltage-time curve is time is almost zero (tok), then there was no contact between the stripping blades and the wire core of the electric wire. The determination is done through comparing a preknown time tok with a measured time wherein the measured time is measured between the timepoint when the electric signal was applied to the stripping blades and the timepoint when the voltage-time curve converted from the displacement current reaches the predetermined voltage level V. When the determination circuit determines that the time until a predetermined voltage-level V is the time tng (which is, obviously a value higher than zero), it thereby detects that the stripping blades contact the wire core. The determination circuit 120 determines whether a measured time is the time tok representing a non-contact or time tng representing a contact. Wherein the time (t) is measured between the timepoint when the square DC signal was applied to the stripping blades 27 and the timepoint when the voltage curve (converted from the displacement current) reaches a predetermined voltage level V.

The determination circuit 120 alternatively may use more than one determinations as described before (with more than one predetermined times and/or more than one predetermined voltage levels) for building a more accurate overall majority determination. Thus more than one point on the transient time curve of the displacement current is considered for the determination.

Figure 1D:
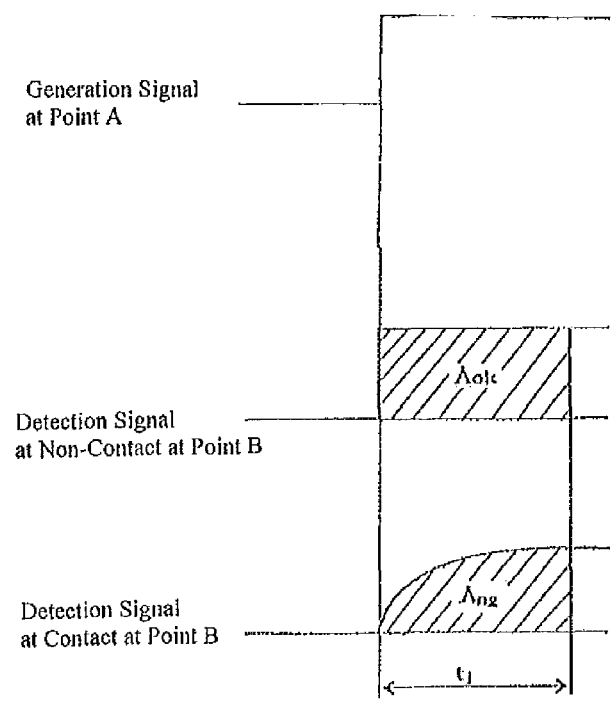
Figure 2:
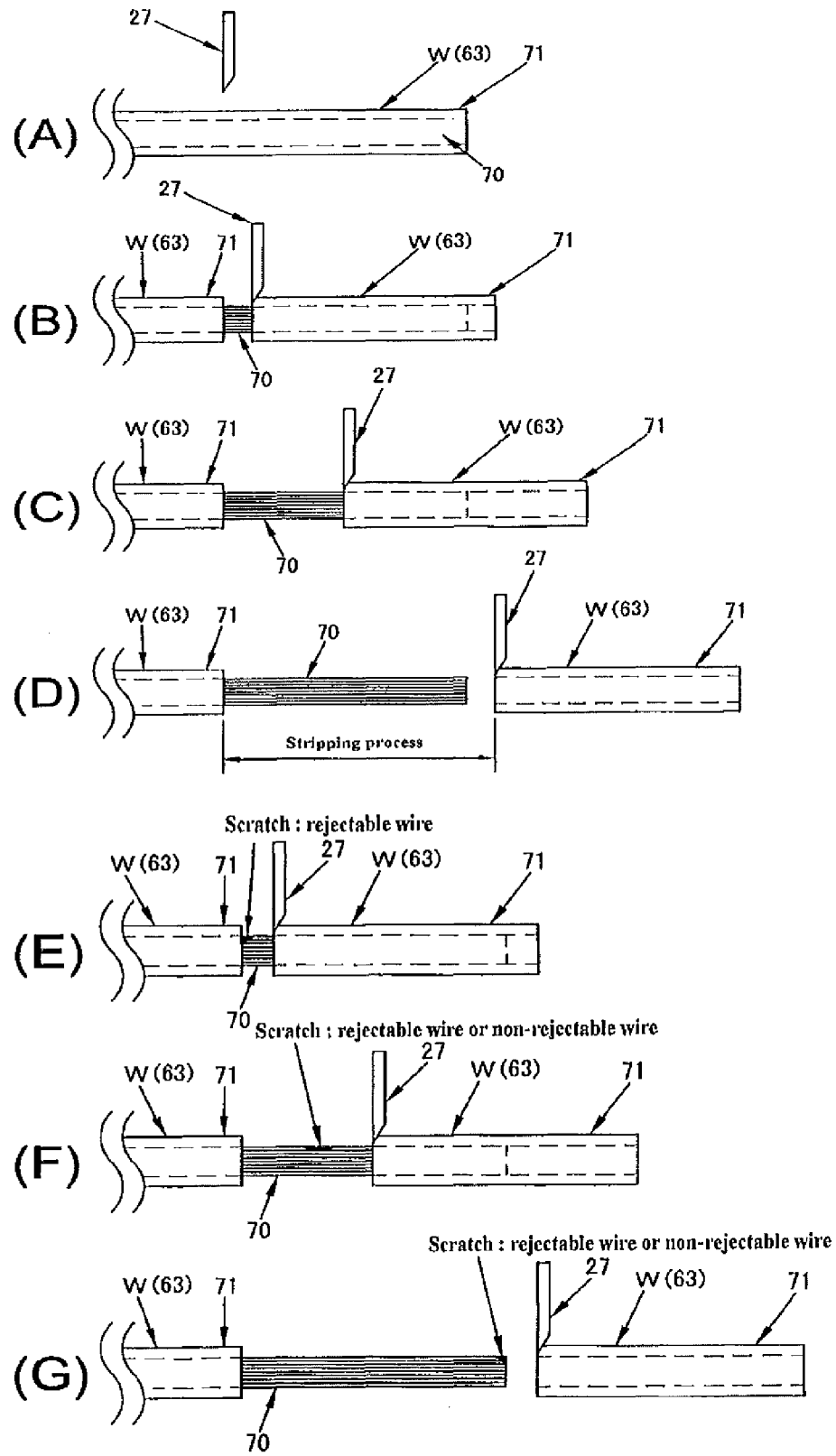
FIG. 2 Side view showing the state of setting of objective time span in stripping process for a wire stripper as above.

Referring to FIG. 1(D) the determination can also be done through comparing a predetermined value (Aok) with a value (Ang) which approximately equals the time integration of the voltage-time curve over a predetermined time period. Such an approximate time integration can be done for example with a simple capacitve-resistive-low-pass-filter. Instead of comparing areas or time integrations, it would also be conceivable to analyze the slope of the curve. A differentiator which determines the curve slope of the voltage-time curve may comprise an operational amplifier.

The coating stripping operation including the said detecting operation is described next on the basis of the explanatory view of operation of the desktop wire stripper.

First, the incision adjusting knob 17 is turned to set the value indicated in the indication window 21 so as to obtain an incision depth corresponding to the diameter of electric wire to be finished. In parallel herewith, the stopper positioning knob 54 is turned to set the coating stripping length and the lead length adjusting knob 58 is turned to set the lead length to desired values, respectively, while observing the indication window 57. The volume (thickness) of the coating to be torn off can be reduced at this moment to ensure a smooth and stable stripping operation by increasing the incision depth as far as possible.

Figure 5A:
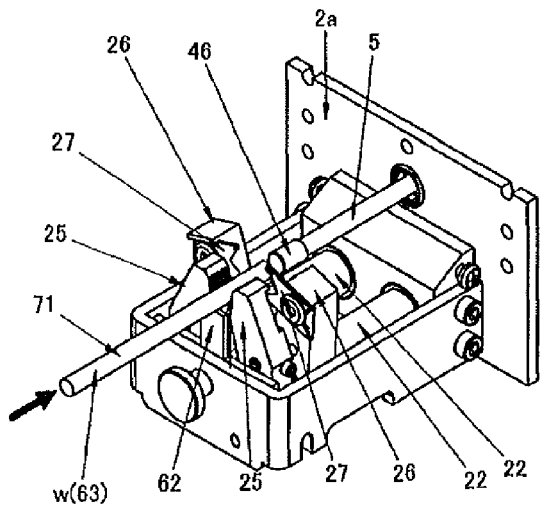
FIG. 5 Perspective view of a desktop wire stripper as above in stripping operation showing the state in which (A) electric wire is inserted into the gripper, (B) electric wire is gripped by the gripper and the stripping blades are fed into the wire coating and (C) the coating has been stripped.
Figure 5B:
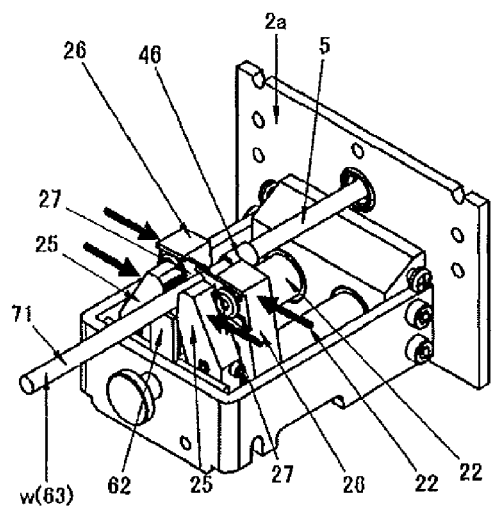

As shown schematically in FIG. 5(A), the tip of wire W (63) is inserted between the grippers 25, 25 and strikes against the stopper 46 at the front end of the sensor rod 45 to push it slightly backward so that the sensor rod 45 retracts against a weak force of spring 48 and blocks a sensor 47 with its rear end. When the sensor 47 detects a retraction of the sensor rod 45, it releases a detection signal to start the motor 7 in forward direction to advance the main shaft 3.

At the same time when the impedance immediately before the beginning of stripping operation is stored on the basis of the signal detected by the sensor 47, the said determination regarding contact detection is started. It is then continued during one process until the motor stops by a motor stop signal to determine whether the stripping blade 27 has come in contact with the core 70 of electric wire W (63).

It can be set to determine on one hand a wire product as rejectable (no good) when there has been any core contact, even if so slight as shown in FIG. 2(E), as far as the time span from FIG. 2(A) to FIG. 2(B), namely the early stage of stripping process after starting incision is concerned, but to determine on other hand a wire product also as non-rejectable which has suffered from a core contact as shown in FIG. 2(F) in the further processes. It can freely be set also by use of the temporal management function not to detect any contact between the stripping blades and the wire core immediately before termination of the stripping process, as far as the time span from FIG. 2(C) to FIG. 2(D).

It is accordingly also possible owing to the temporal management function to exclude from the objectives of determination in case of a minute contact scratch on the tip arising immediately before stripping termination as illustrated in FIG. 2(G).

Figure 7:
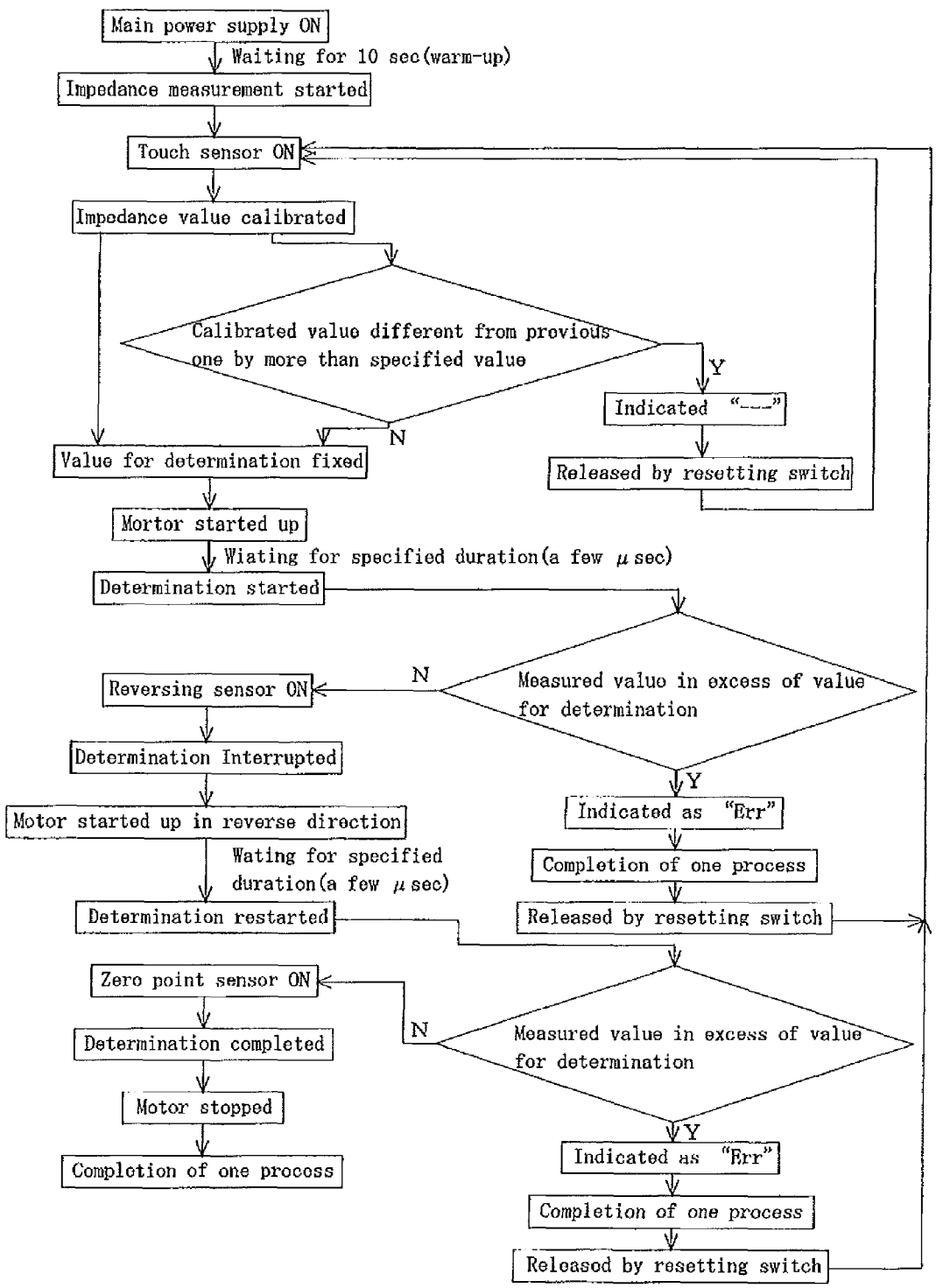
FIG. 7 Flow chart of motor operation and determination of contact for a desktop wire stripper as above.

It becomes further possible not to make determination regarding contact detection for a certain time span immediately after output of a signal for starting up, reversing and stopping the motor to prevent influences of spike noise from it at start-up, etc. in order to raise the accuracy of contact detection (see FIG. 7).

Owing to the said temporal management function, duration of contact between the wire core and the stripping blades is available as another criterion for determination. That is to say, a long-duration contact may cause a long and deep scratch, while a contact of an extremely short duration may not cause any scratch depending on the extent of contact. It is, therefore, possible when deeming the duration as a determination criterion to distinguish between an extremely short contact without affecting the wire quality and a long-duration contact by sampling the duration of contact between the wire core and the stripping blades on the microsecond time scale. The elementary equipment for the said temporal management function may be replaced with a positional information equipment such as encoder and magnet scale.

The ball nut member 9 is fixed in position as shown in FIG. 3 at the beginning of forward rotation of the motor 7 so that the main spindle 3 advances along with advance of the ball screw shaft 8 which is, by its forward rotation, screwed with the balls in the ball nut member 9. The main spindle 3 hereby pushes first the cam rollers 33, 33 in the first conical cam 11 to both sides so that the oscillating members 31, 31 oscillate to apart from each other at the upper end and push the rollers 35, 35 on the arms 34, 34 to rotate the tube shafts 22, 22 integrated with them, respectively, so as to close the blade holders 26, 26 located at the front end of the tube shafts. The stripping blades 27, 27 in the blade holders 26, 26 are then fed into the coating 71 of wire W to a prescribed depth and clamp it as shown in FIG. 5(B).

On the other hand, the advancing main spindle 3 pushes in both directions the cam rollers 29, 29 on the arms 28, 28 of the auxiliary shafts 4, 4 in the second conical cam 12 to rotate the auxiliary shafts 4,4 in opposite directions to each other so that the grippers 25, 25 close to grip the wire W.

Figure 5C:
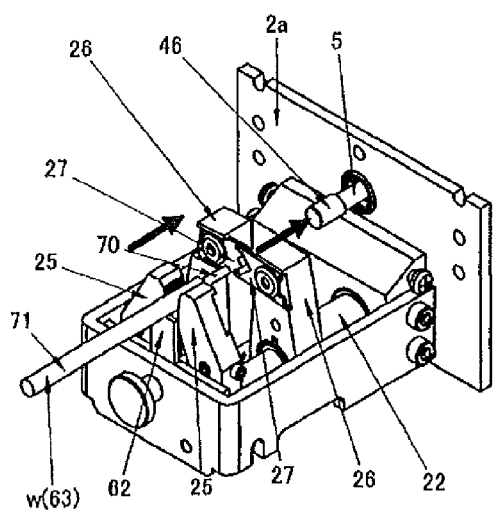

When this state has been reached, the main spindle 3 stops advancing as the front end of the positioning member 18 strikes against the pin 14a of the first conical cam 11 of the main spindle 3 so that the ball nut member 9 begins to retract by rotation of the ball screw shaft 8. Retraction of the ball nut member 9 results in retraction of the bearing 50 of the lever 51 so that the positioning rod 5 being energized by the tension spring retracts while pushing the upper end of the lever 51 and that the tube shafts 22, 22 retract which are connected to the auxiliary shafts 4, 4 via the arm 23. The coating 71 having been cut at the wire end by the stripping blades 27, 27 is hereby pulled away from the wire core 70 as shown in FIG. 5(C).

Figure 6:
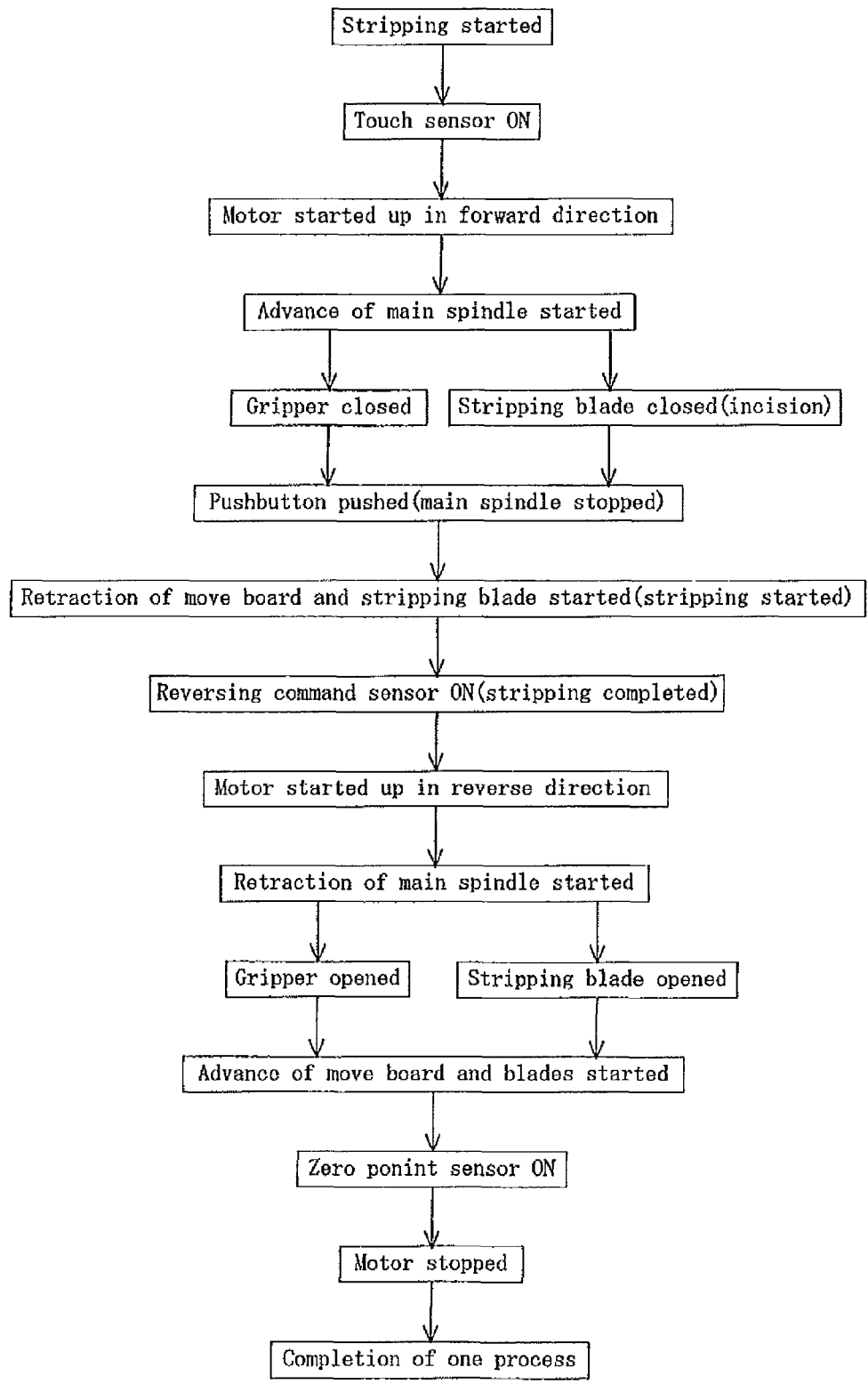
FIG. 6 Flow chart of mechanical operation of a desktop wire stripper as above.

A flow of the said stripping operation is summarized in FIG. 6 and that of the said contact determination including motor operation is shown as a whole in FIG. 7.

FIG. 8 is an explanatory view of operation of an automatic wire stripper commonly in use (in the following referred to as "automatic stripper",) to which this invention can be applied. This automatic wire stripper is furnished with a length-measuring and cutting function to cut the electric wire into constant lengths in addition to a function to strip the coating away from it.

Figure 8A:
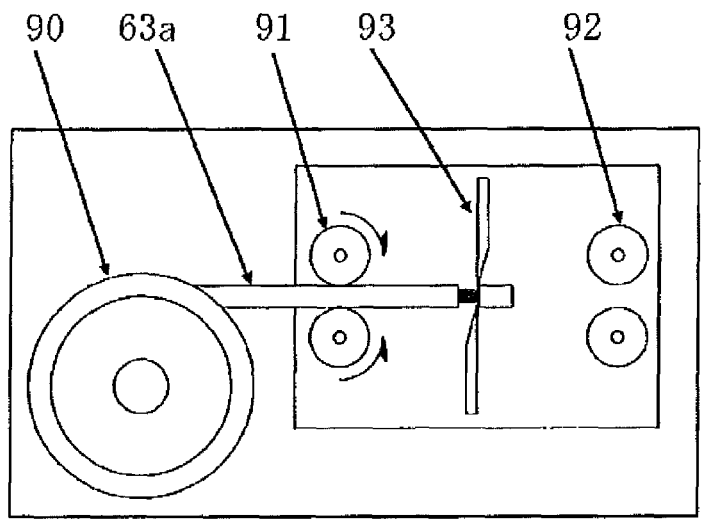
FIG. 8 Explanatory view of automatic wire stripper as another embodiment of the invention.

The electric wire 63a pulled out of a bobbin 90 in which it is housed is delivered to the front end of stripping blades 93 by means of delivery rollers 91 as shown in FIG. 8(A) and the blades 93 are fed into the coating, which is then stripped away by reversing the delivery rollers 91.

Figure 8B:
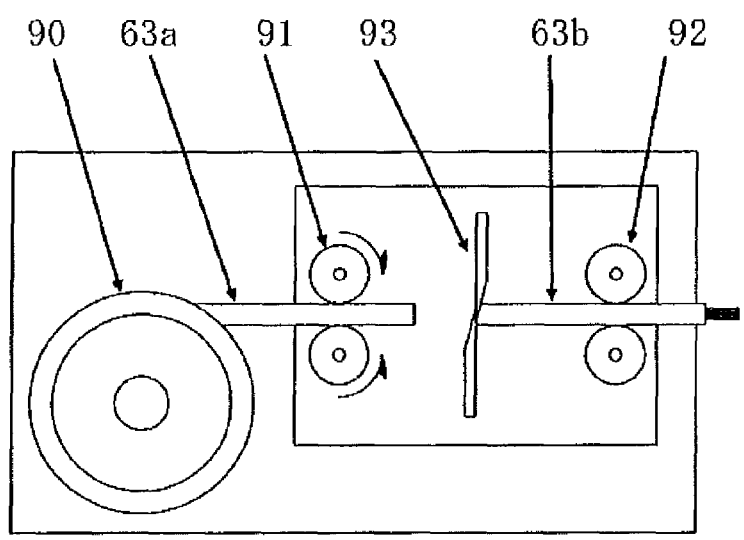
Figure 8C:
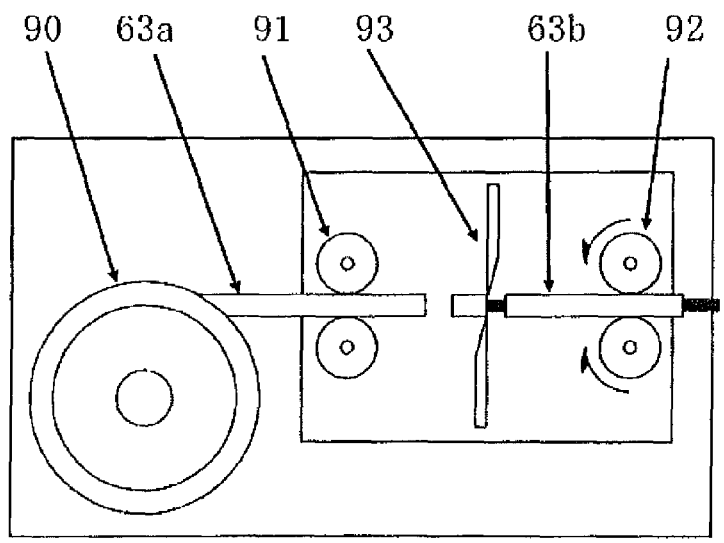

Next, an electric wire 63a is delivered by a prescribed length, inserted between delivery rollers 92 and cut by means of the stripping blades 93 as illustrated in FIG. 8(B). After cutting, the stripping blades 93 are opened to return a cut electric wire 63b by the stripping length by means of delivery rollers 92 as illustrated in FIG. 8(C). The stripping blades 93 are fed again into the coating, which is then stripped away by reversing the delivery rollers 92.

This invention is suitable especially for an automatic wire stripper of high speed operation type. Although a scratch on the core of electric wire 63a according to FIG. 8 is detectable also with heretofore known core scratch detection systems, it is difficult for such systems to detect any scratch on the core of electric wire 63b which has been cut short. The said function of detecting core scratch according to this invention is valid also for such case.

As the stripping blades come in contact with the wire core with a high probability in wire stripping processes, error signal is released every time when the stripping blades and the wire core have come in contact with each other to result in a frequent stoppage of automatic strippers provided with the heretofore known systems of core scratch detection. On the contrary, this invention enables to determine a wire product also as non-rejectable even if the stripping blades have come in contact with its core according to the extent or portion of contact by above-mentioned employment of the function to manage temporal elements of contact including duration, position etc. of contact so that unnecessary operation discontinuations can be prevented.

Note that in the above described example, a change in impedance caused by addition of capacitance of the wire core is detected, but as another detection method other than the method of detecting a change in impedance, a contact of the stripping blades with the wire core can also be detected by detecting a current (displacement current) flowing into the stripping blades.

Figure 9:
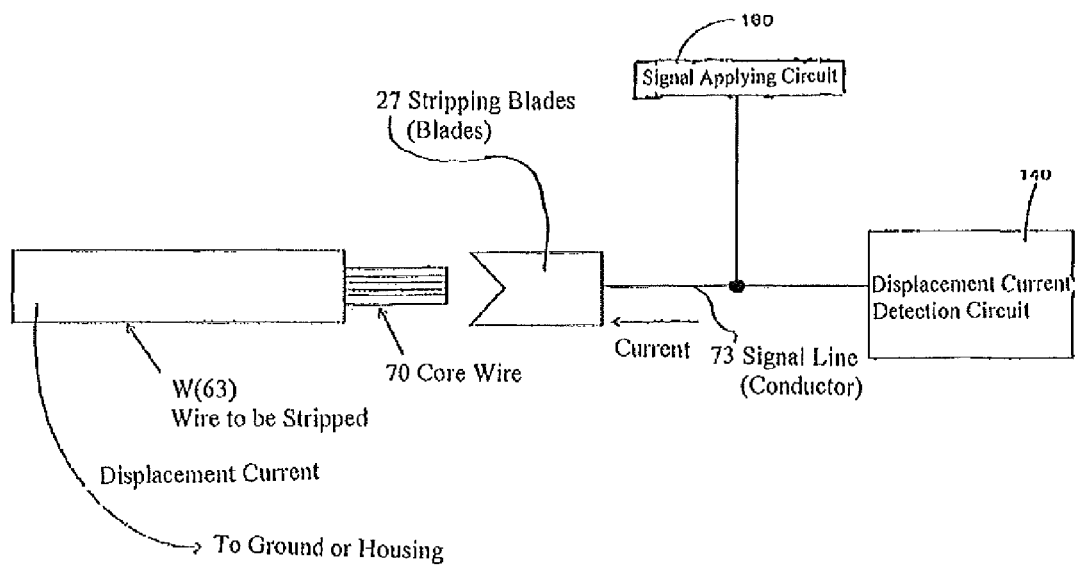
FIG. 9 Schematic view of main components of the other detection system.
Figure 10:
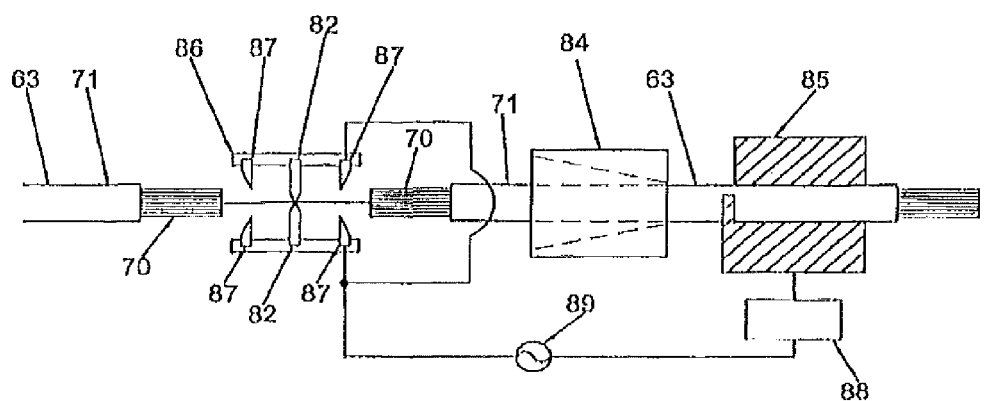
FIG. 10 Explanatory view of a wire core scratch detector according to JP 7-87643.

Specifically, as illustrated in FIG. 9, in the wire stripper including an electric signal applying circuit 130 that applies an electric signal to the stripping blades 27, and a displacement current detection circuit 140 that detects a current flowing into the stripping blades 27, when the stripping blades 27 do not contact the wire core 70 of a wire W (63) having the coating 71 to be stripped, even a change in voltage by applying a voltage to the stripping blades 27 does not cause a current to flow because there is no capacitance component in the circuit and the circuit is not closed.

However, when the stripping blades 27 contact the wire core 70 of the wire W (63), the signal line 73 enters the same state as that in which a monopole antenna is connected. Thus, when a voltage is changed, the wire W (63) plays the role of antenna, thereby causing a displacement current to flow toward ground or the housing. The displacement current is the same as the current flowing into the stripping blades 27. Accordingly, the detection circuit 140 can detect a presence or absence of the displacement current, that is, whether or not the stripping blades 27 contact the wire core 70 by detecting a current flowing into the stripping blades 27.

However, there might be some parasitic capacitance in the circuit of the components 27, 73, 130 and 140. In this case there will be a displacement current even if the stripping blades 27 does not contact the wire core 70. In such situation, the displacement current detection circuit 140 detects the presence or absence of a bigger displacement current than the displacement current at a time of non-contact between the stripping blades 27 and the wire core 70.

Thus, the detection method is clearly different and differentiated from the detection method using a capacitance.

While some embodiments of the invention have been described in the above, the working form of the invention is not limited to the said embodiments, but is variable in many ways.

For example, the waveform of the DC signal and the time t described above may be variously selected or modified.

INDUSTRIAL APPLICABILITY

The present invention can provide a wire stripper that can improve the function of detecting a contact between the wire core of the electric wire and the stripping blades when the end portion of the coating of the electric wire is automatically stripped at a predetermined length to improve the quality of the processed electric wire, and can simplify the configuration of the signal generator circuit for use in the detection so as to reduce costs by simplifying the configuration of the entire system.

REFERENCE NUMERAL LIST 5 positioning rod, 25 gripper, 26 blade holder, 27 stripping blade, 45 sensor rod, 46 stopper, 47 sensor, 53 control board, 63 (W) electric wire, 70 core, 71 coating, 73 conductor (signal line), 105 signal generator (generating) circuit, 106 current limiting circuit, 110 displacement current detection circuit and current-voltage conversion circuit, 120 contact determination circuit.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A wire stripper configured to feed stripping blades into coating of an electric wire and to strip a part of the coating by moving the stripping blades relatively against the electric wire, comprising:

an electric signal generator circuit that applies a square wave DC electric signal to the stripping blades through a signal line;

a displacement current detection and current-voltage conversion circuit that detects a displacement current as a function of time from the stripping blades through the signal line, converts the displacement current to a voltage presentable as a voltage-time curve; and a determination circuit that determines whether a non-contact or a contact of the stripping blades with the wire core occurred by analyzing the voltage-time curve obtained from the displacement current detection and current-voltage conversion circuit.

2. The wire stripper according to claim 1, wherein the electric signal generator circuit applies the square wave DC electric signal to the stripping blades through a signal line; the displacement current detection and current-voltage conversion circuit detects the displacement current from the stripping blades through the signal line at a time when a predetermined time has elapsed since the electric signal was applied to the stripping blades, converts the displacement current to a voltage, and, if applicable, holds the voltage; and the determination circuit determines whether the converted voltage at the predetermined time is a voltage level representing a non-contact or a voltage level representing a contact of the stripping blades with the wire core, and wherein when the stripping blades contact the wire core of the electric wire in a process of stripping the coating, the determination circuit determines that the converted voltage level is a voltage level of the signal line representing the contact, and thereby detects that the stripping blades contact the wire core.

3. The wire stripper according to claim 2, wherein the determination circuit performs more than one determination that detects whether the stripping blades contact the wire core in a process of stripping the coating of the electric wire for building a more accurate overall majority determination.

4. The wire stripper according to claim 1, wherein the determination circuit determines whether a time until the converted voltage reaches a predetermined level, wherein the time is derived from the voltage-time curve obtained by the displacement current detection and current-voltage conversion circuit, is a time representing a non-contact or the time representing a contact of the stripping blades with the wire core, and wherein when the stripping blades contact the wire core of the electric wire in a process of stripping the coating, the determination circuit determines that the time at the predetermined level of the converted voltage derived from the voltage-time curve is the time of the signal line representing the contact, and thereby detects that the stripping blades contact the wire core.

5. The wire stripper according to claim 1, wherein the determination circuit determines whether an approximate time integration of the voltage-time curve over a predetermined time curve obtained by the displacement current detection and current-voltage conversion circuit is a predetermined value representing a non-contact of the stripping blades with the wire core.

6. The wire stripper according to claim 1, wherein the electric signal generator circuit generates the electric signal for detecting an impedance (including resistance, inductance, and capacitance) through the stripping blades; and including a signal analyzer circuit incorporating the detection and conversion circuit for detecting the impedance; and wherein when the stripping blades contact the wire core of the electric wire in a process of stripping the coating, a change in the impedance caused by addition of the impedance of the wire core to the stripping blades is detected as the displacement current, the displacement current is converted into a voltage and held, and the voltage level is determined by the determination circuit.

7. The wire stripper according to claim 6 including detection of any contact between the wire core and the stripping blades through applying the electric signal to the stripping blades and monitoring any phenomenon of change of the electric signal by the impedance of the wire core at a moment of contact of the stripping blades with the wire core.

8. The wire stripper according to claim 1, wherein the electric signal generator circuit generates a square wave of a single power source as the electric signal, continuously holds a transient voltage at rising time of the square wave when the voltage is held, and continuously detects a presence or absence of contact of the stripping blades with the wire core.

9. The wire stripper according to claim 1, including setting an objective time point or duration of detection whether the stripping blades have come in contact with the wire core and to manage each temporal element including at least one of a time point of contact before starting or in the course of the stripping operation or immediately before completion of the stripping operation, as well as duration of contact between the stripping blades and the wire core.

10. The wire stripper according to claim 9, wherein the temporal element managing allows for setting of conditions of determination under which the electric wire is deemed as non-rejectable, depending on duration or point of contact, even when the stripping blades have come in contact with the wire core.

11. The wire stripper according to claim 1, wherein at a front end portion of the electric wire drawn from a wire storage unit, the stripping blades are fed into the coating of the electric wire, and then the electric wire is conveyed backward to strip a part of the coating, at the time of which a core contact detecting means detects a contact of the stripping blades with the wire core; and after the coating is stripped at the front end portion, the electric wire is conveyed by a predetermined length forward in a drawing direction, wherein the electric wire is cut by the stripping blades at a position backward from the front end portion, and then the electric wire is returned backward by an expected strip length, wherein the stripping blades are fed into the coating, and then the electric wire is conveyed forward to strip a part of the coating at which time the core contact detecting means detects a contact of the stripping blades with the wire core.

12. The wire stripper according to claim 1, wherein the stripping blades function as electrodes for detecting any contact between the stripping blades and the wire core, and the electric signal input to the stripping blades and a signal output from the stripping blades for confirming that the contact between the wire core and the stripping blades has been detected are applied and taken out respectively through an identical point.

13. The wire stripper according to claim 1, wherein the stripping blades are a pair of the stripping blades placed opposite to each other across the electric wire and adapted to allow the electric wire to move after the stripping blades are fed into the coating and a stripping operation is started when a leading end of the electric wire strikes a front end of a sensor rod after passing between the pair of stripping blades.

14. The wire stripper according to claim 1, wherein the wire stripper operates as an automatic device to strip a part of the coating of the electric wire, and also cut the electric wire at a prescribed position.

\* \* \* \* \*